United States Patent
Juneja (10) Patent No.: US 10,554,512 B2
(45) Date of Patent: Feb. 4, 2020

(54) METHODS, SYSTEMS, AND COMPUTER READABLE MEDIA FOR SUPPRESSING REDUNDANT PACKET FILTER INSTALLATION ON USER EQUIPMENT IN A MOBILE NETWORK

(71) Applicant: Oracle International Corporation, Redwood Shores, CA (US)

(72) Inventor: Rohit Juneja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 115 days.

(21) Appl. No.: 15/616,703

(22) Filed: Jun. 7, 2017

(65) Prior Publication Data

US 2018/0359163 A1    Dec. 13, 2018

(51) Int. Cl.
*H04L 12/00* (2006.01)
*H04L 12/26* (2006.01)
*H04M 15/00* (2006.01)

(52) U.S. Cl.
CPC .......... *H04L 43/028* (2013.01); *H04M 15/66* (2013.01)

(58) Field of Classification Search
CPC ..... H04L 43/028; H04M 15/66; H04W 88/02; H04W 88/08
See application file for complete search history.

(56) References Cited

U.S. PATENT DOCUMENTS

| | | |
|---|---|---|
| 8,605,655 B1 | 12/2013 | Sahai et al. |
| 8,787,399 B2 | 7/2014 | Hedman et al. |
| 8,817,610 B2 | 8/2014 | Willars et al. |
| 9,154,991 B2 | 10/2015 | Ma |
| 2011/0122885 A1* | 5/2011 | Hedman ............. H04L 65/1016 370/412 |
| 2011/0202647 A1* | 8/2011 | Jin ....................... H04L 41/0806 709/223 |

(Continued)

FOREIGN PATENT DOCUMENTS

WO    WO 2013/075337 A1    5/2013

OTHER PUBLICATIONS

"3rd Generation Partnership Project; Technical Specification Group Core Network and Terminals; Policy and Charging Control (PCC); Reference points (Release 13)," 3GPP TS 29.212 V13.5.0, pp. 1-257 (Mar. 2016).

(Continued)

*Primary Examiner* — Michael Thier
*Assistant Examiner* — Brian P Cox
(74) *Attorney, Agent, or Firm* — Jenkins, Wilson, Taylor & Hunt, P.A.

(57) ABSTRACT

Methods, systems, and computer readable media for suppressing redundant packet filter installation on user equipment in a mobile network are disclosed. In some examples, a method includes installing a first packet filter on user equipment (UE) for the mobile network. The method includes receiving a filter installation instruction from a policy rules node for the policy enforcement node to install at least a second packet filter on the UE. The method includes determining that the second packet filter is redundant to the first packet filter and, in response to determining that the second packet filter is redundant to the first packet filter, disregarding the filter installation instruction to install the second packet filter on the UE.

17 Claims, 4 Drawing Sheets

(56) References Cited

U.S. PATENT DOCUMENTS

| | | |
|---|---|---|
| 2013/0021905 A1 | 1/2013 | Schramm |
| 2013/0088966 A1 | 4/2013 | Mahkonen et al. |
| 2015/0009896 A1 | 1/2015 | Puhakka |
| 2015/0245196 A1* | 8/2015 | Rivas Molina ....... H04W 8/186 370/259 |
| 2015/0245240 A1* | 8/2015 | Lovsen ............... H04L 41/5022 370/259 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.3.0, pp. 1-324 (Jun. 2015).

"3rd Generation Partnership Project; Technical Specification Group Core Network and Terminals; Policy and Charging Control over Rx reference point (Release 10)," 3GPP TS 29.214 V10.14.0, pp. 1-53 (Mar. 2015).

Barton, "Gx interface—sitting between PCRF and PCEF," LTE and Beyond http://www.lteandbeyond.com/2012/01/gx-interface-sitting-between-pcrf-and.html, pp. 1-6 (Jan. 18, 2012).

* cited by examiner

METHODS, SYSTEMS, AND COMPUTER READABLE MEDIA FOR SUPPRESSING REDUNDANT PACKET FILTER INSTALLATION ON USER EQUIPMENT IN A MOBILE NETWORK

TECHNICAL FIELD

The subject matter described herein relates generally to filter installation on user equipment in mobile networks. More particularly, the subject matter described herein relates to methods, systems, and computer readable media for suppressing redundant packet filter installation on user equipment in a mobile network.

BACKGROUND

A $3^{rd}$ Generation Partnership Project (3GPP) mobile network, such as a long term evolution (LTE) network, typically includes a core network, a transport network, and one or more radio access networks. The core network for the mobile network establishes bearers (logical connections) among service nodes on a path between a wireless device, attached to one of the radio access networks, and a packet network, e.g., the Internet. The service nodes then use the bearers to transport subscriber traffic between the wireless device and the packet network.

The core network can include a policy and charging rules function (PCRF) that sends charging rules with packet filters to a policy and charging enforcement function (PCEF). The PCEF then enforces rule installation on wireless devices and can trigger a create bearer request or update bearer request message with the packet filters to the wireless devices for installation. The wireless devices then install the packet filters and typically send a success response. Existing packet filters on a default or dedicated bearer can be modified (added or removed) using an update bearer request message from a packet gateway to a wireless device. However, modifying packet filters on existing bearers may sometimes result in redundant packet filters installed on the wireless devices, which can result in unnecessary messaging to install those filters, message processing at various nodes to install those filters, usage of unnecessary filter identifiers from a limited pool of filter identifiers, and memory wasted at wireless devices for those filters.

Accordingly, in light of these difficulties, there exists a need for methods, systems, and computer readable media for suppressing redundant packet filter installation on user equipment in a mobile network.

SUMMARY

The subject matter described in this specification relates to methods, systems, and computer readable media for suppressing redundant packet filter installation on user equipment in a mobile network. In some examples, a method includes, at a policy enforcement node comprising at least one processor, installing at least a first packet filter on user equipment (UE) for the mobile network; after installing the first packet filter on the UE, receiving a filter installation instruction from a policy rules node for the policy enforcement node to install at least a second packet filter on the UE; determining that the second packet filter is redundant to the first packet filter because the first packet filter specifies each of one or more packet filtering rules of the second packet filter and the first packet filter is installed on the UE; and in response to determining that the second packet filter is redundant to the first packet filter, disregarding the filter installation instruction to install the second packet filter on the UE.

In some examples, the method includes receiving, before receiving the filter installation instruction, a suppression instruction from the policy rules node to suppress redundant packet filter installation by the policy enforcement node, wherein disregarding the filter installation instruction comprises disregarding the filter installation instruction as a result of both receiving the suppression instruction and determining that the second packet filter is redundant to the first packet filter. In some examples, the suppression instruction is a message-level instruction for the policy enforcement node to suppress redundant packet filter installation on any default bearers established by the policy enforcement node. In some examples, the suppression instruction is a message-level instruction for the policy enforcement node to suppress redundant packet filter installation on each bearer of one or more bearers for a session of the UE. In some examples, the suppression instruction is a rule-level instruction for the policy enforcement node to suppress redundant packet filter installation on a particular bearer of one or more bearers for a session of the UE. In some examples, the suppression instruction is a filter-level instruction for the policy enforcement node to suppress redundant packet filter installation for a particular filter set specified by the suppression instruction.

In some examples, the mobile network is a long term evolution (LTE) network, the policy enforcement node is an LTE policy and charging enforcement function (PCEF), and the policy rules node is an LTE policy and charging rules function (PCRF). The method can include receiving a credit-control-answer (CCA) or re-auth-request (RAR) message from the PCRF containing a suppression instruction to suppress redundant packet filter installation by the PCEF.

In some examples, installing the first packet filter comprises allocating a first filter identifier to the first packet filter from a pool of a limited number of filter identifiers for the UE, and wherein disregarding the filter installation instruction comprises refraining from allocating a second filter identifier to the second packet filter. In some examples, disregarding the filter installation instruction comprises sending a response to the policy rules node indicating successful filter installation.

According to another aspect of the subject matter described in this specification, a system for suppressing redundant packet filter installation on user equipment in a mobile networks provided. The system includes at least one processor and a policy enforcement node implemented on the at least one processor and configured to perform operations comprising: installing at least a first packet filter on user equipment (UE) for the mobile network; after installing the first packet filter on the UE, receiving a filter installation instruction from a policy rules node for the policy enforcement node to install at least a second packet filter on the UE; determining that the second packet filter is redundant to the first packet filter because the first packet filter specifies each of one or more packet filtering rules of the second packet filter and the first packet filter is installed on the UE; and in response to determining that the second packet filter is redundant to the first packet filter, disregarding the filter installation instruction to install the second packet filter on the UE.

The subject matter described in this specification may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
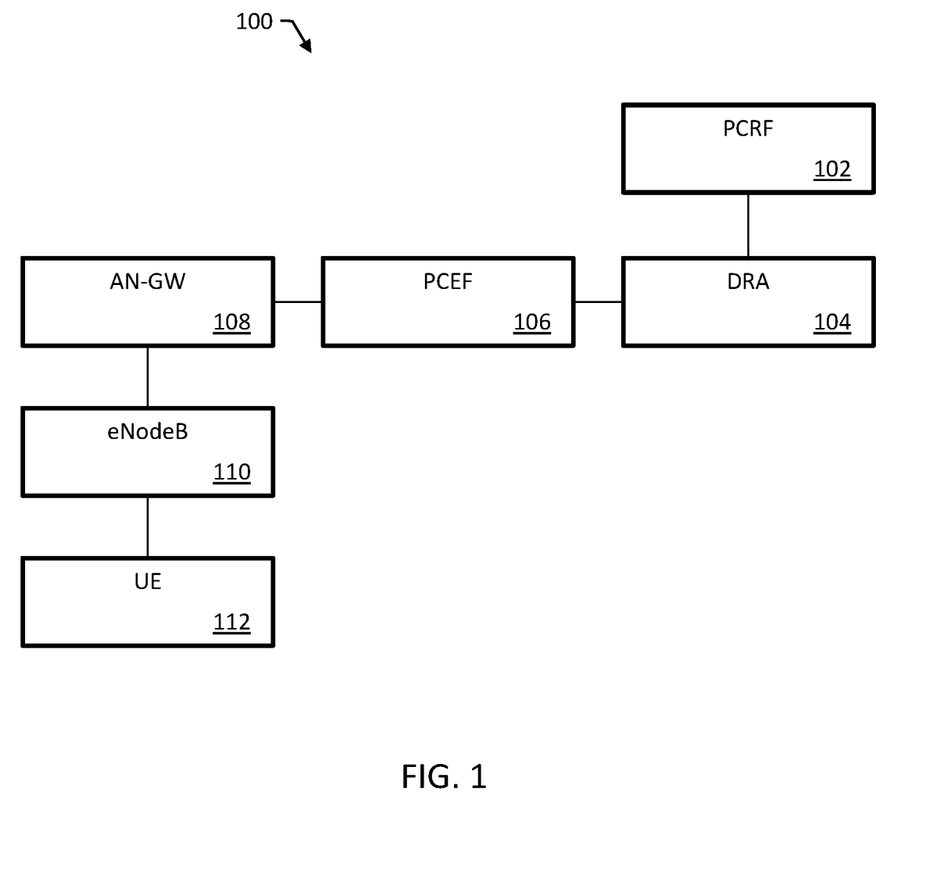
FIG. 1 is a block diagram of a portion of an example core network for a mobile network.

FIG. 1 is a block diagram of a portion of an example core network 100 for a mobile network. The mobile network can be, e.g., a long term evolution (LTE) cellular telecommunications network. Network 100 includes a policy and charging rules function (PCRF) 102, a diameter routing agent (DRA) 104, a policy and charging enforcement function (PCEF) 106, and access network gateway (AN-GW) 108. User equipment 112 connects to network 100 using an evolved node B (eNodeB) 110 for a radio access network.

PCRF 102 may include on or more processors that perform the operations described in this specification for installing filters on user equipment 112. For example, PCRF 102 may be implemented on a computing platform includes one or more processor blades, each implementing a PCRF or other function. PCRF 102 may be implemented in a distributed computing system or any appropriate system of one or more computers. PCRF 102 is part of a 3GPP policy charging control (PCC) architecture. The elements of the PCC provide access, resource, and quality-of-service (QoS) control.

In operation, PCRF 102 functions in real-time or near real-time to determine policy rules in the mobile network. PCRF 102 can operate at the network core and access user information and other specialized functions in a centralized manner. PCRF 102 can aggregate information to and from the mobile network, operational supports systems, and other sources in real-time or near real-time, which can be useful for the creation of rules and automatically making policy decisions for each user active on the mobile network. Using PCRF 102, the mobile network can offer multiple services, QoS levels, and charging rules.

In some examples, PCRF 102 provides the ability to manage both network and user policy in real-time or near real-time. PCRF 102 can efficiently and dynamically route and prioritize network traffic. PCRF 102 can provide a unified view of user context based on one or more of device, network, location, and billing data. PCRF 102 can provide key inputs to revenue assurance and bandwidth management.

PCRF 102 can communicate with other systems in network 100 using Diameter. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message. DRA 104 is configured to route Diameter messages in network 100.

PCEF 106 is configured to enforce any policy and charging control (PCC) decisions made by PCRF 102 and handle service data flows (e.g., forwarding or dropping packets related to a requested service). PCRF 102 communicates with PCEF 106, e.g., via a Gx interface. The Gx interface can be used to install, modify, and remove policy and charging commands and rules between PCRF 102 and PCEF 106 in either pull or push modes.

PCEF 106 may be configured for traffic detection and resultant policy enforcement. PCEF 106 provides information to PCRF 102 about UE 112 and any requested services. For example, PCEF 106 may provide a subscriber identifier (ID), an internet protocol (IP) address of UE 112, and an identifier of a network that provides the requested service.

PCEF 106 is implemented on a computer system comprising one or more processors. For example, PCEF 106 may be implemented in a server such as a packet gateway (PGW) or a computer system integrated with the PGW. The PGW can provide connectivity from UE 112 to external packet data networks by being the point of exit and entry of traffic for or/and from UE 112. PCEF 106, in combination with the PGW, can perform policy enforcement, packet filtering, charging support, packet screening, and the like.

AN-GW 108 is configured for the delivery of data packets to and from a number of mobile stations, e.g., mobile stations within a geographic service area. AN-GW 108 performs tasks including packet routing and transfer, mobility management (attach/detach and location management), logical link management, and authentication and charging functions. The location register of the AN-GW 108 can store location information (e.g., current cell, current VLR) and user profiles (e.g., IMSI, addresses) of GPRS users registered with AN-GW 108.

eNodeB 110 is an element of an LTE radio access network. eNodeB 110 can include the communications hardware that communicates directly with UE 112. eNodeB 110 is configured for operation without a separate controller element, which can simplify the network architecture and allow lower response times. eNodeB 110 can use the S1-AP protocol on the S1-MME interface with a mobility management entity (MME) for control plane traffic, and eNodeB 110 can use the GTP-U protocol on the S1-U interface for user plane traffic.

UE 112 can be any appropriate user computer system. UE 112 typically includes at least one processor, memory, wireless communications hardware, a display, and at least one user input device. UE 112 can be, for example, a wireless mobile device such as a phone, tablet, or laptop.

PCRF 102 can be configured to install various packet filters on UE 112 by sending filter installation instructions to PCEF 106. PCEF 106 then carries out the filter installations on UE 112. PCRF 102 may then send filter installation instructions to PCEF 106 to install additional packet filters that are redundant to the packet filters already installed on UE 112. For example, PCRF 102 may not store a record of which packet filters are installed on UE 112, so PCRF 102 may not be able to locally determine whether the additional packet filters are redundant or not.

PCRF 102 can send filter installation instructions using any appropriate message and attribute-value pairs (AVPs) within the message. For example, PCRF 102 can send a Charging-Rule-Definition as set forth below:

Charging-Rule-Definition::=<AVP Header: 1003>
        {Charging-Rule-Name}
        *[Flow-Information]<<<AVP of Interest
        other AVPs PCRF 102 can use the flow-information AVP. The flow-information AVP is of type grouped. The flow-information AVP is sent from PCRF 102 to PCEF 106 and contains the information from a single IP flow packet filter as set forth below:

Flow-Information::=<AVP Header: 1058>
        [Flow-Description]
        [Packet-Filter-Identifier]
        [Packet-Filter-Usage]
        [ToS-Traffic-Class]
        [Security-Parameter-Index]
        [Flow-Label]
        [Flow-Direction]
        *[AVP]

PCRF 102 can use the flow-description AVP. The flow-description AVP is of type IPFilterRule. The flow-description AVP defines a packet filter for an IP flow with the following information:

Action shall be keyword "permit".
    Direction shall be keyword "out".
    Protocol shall be the decimal protocol number or, to indicate that the value is not used for matching packets, the keyword "ip".
    Source IP address (possibly masked) or, to indicate that the value is not used for matching packets, the keyword "any".
    Source port is optional and, if present, shall be the decimal port number or port range.
    Destination IP address (possibly masked) or, to indicate that the value is not used for matching packets, the keyword "assigned".
    Destination port is optional and, if present, shall be the decimal port number or port range.

PCRF 102 can suppress the installation of redundant packet filters by sending a suppression instruction to PCEF 106. PCEF 106, in response to receiving the suppression instruction, checks filter installation instructions from PCRF 102 to determine whether additional packet filters are redundant to the packet filters already installed on UE 112. PCEF 106 can determine that an additional packet filter is redundant because one of the packet filters already installed on UE 112 specifies each of one or more packet filtering rules of the additional packet filter.

In response to determining that an additional packet filter is redundant, PCEF 106 disregards the filter installation instruction to install the additional packet filter. Typically, PCEF 106 disregards the filter installation instruction as a result of both receiving the suppression instruction and determining that the additional packet filter is redundant to one of the packet filters already installed on UE 112.

Disregarding the filter installation instruction can include refraining from allocating an additional filter identifier for the additional packet filter from a pool of a limited number of filter identifiers for the UE. Disregarding the filter installation instruction can include sending a response to PCRF 102 indicating successful filter installation or sending a response to PCRF 102 indicating that PCEF 106 suppressed installation of the additional packet filter in response to determining that an additional packet filter is redundant.

As a result of suppressing redundant filter installation, messaging in network 100 can be avoided for installing those filters. Message processing at nodes within network 100 can be avoided for installing those filters. Usage of filter identifiers from a limited pool of filter identifiers can be avoided. Memory at UE 112 can be conserved for other uses.

Figure 2:
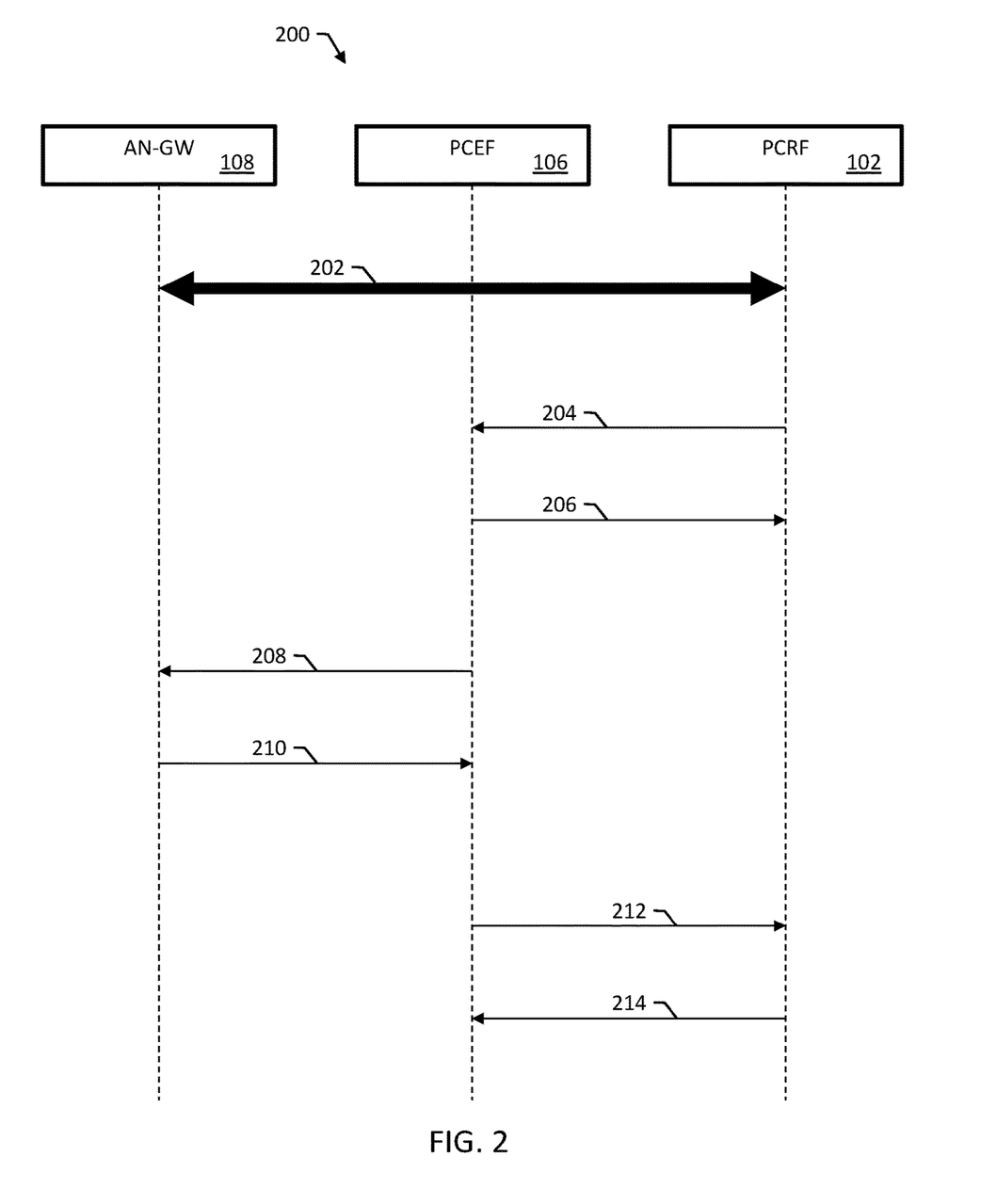
FIG. 2 is a messaging diagram of an example messaging sequence illustrating installation of a first packet filter and suppression of installation of a second, redundant packet filter.

FIG. 2 is a messaging diagram of an example messaging sequence 200 illustrating installation of a first packet filter in the network 100 of FIG. 1 and suppression of installation of a second, redundant packet filter.

Messaging sequence 200 begins with an exchange of session establishment messaging 202. Default and dedicated bearers are created for UE 112 as a result of session establishment messaging 202. For example, the default bearer can be created with a create session request message, and the dedicated bearer can be created with a create session request or create bearer request message. PCRF 102 sends charging rules to PCEF 106 with packet filters, and PCEF 106 enforces packet filter installation on UE 112.

The packet filters are each associated with a unique filter identifier from a pool of a limited number of filter identifiers, e.g., the Traffic Flow Template (TFT) map of 0-255. UE 112 installs the packet filters and sends a success response. Then, the existing set of packet filters on the default or dedicated bearers or both can be modified using, e.g., an update bearer request message from a PGW to UE 112.

PCEF 106 stores a state for UE 112, include an access point name for UE 112 and a list of packet filters and filter identifiers for UE 112. For purposes of illustration, consider an example where the state for UE 112 includes the following information:

QCI=5 (Default Bearer)
        Filter: IP Any Port Any (Catch all Filter)
    QCI=7(Dedicated bearer)
        Filter: Source: IP Any Port Any
            Destination IP:1.1.1.1 Port Any After session establishment messaging 202, PCRF 102 sends a message 204 with filter installation instructions to install two additional packet filters on UE 112. Message 204 is, e.g., an IP-CAN session modification message, such as a CCA-U message in response to a CCR-U message or a RAR message. PCEF 106 can send a response message 206, e.g., a RAA message if message 204 is an RAR message. For purposes of illustration, consider the example described above and suppose that PCRF 102 sends filter installation instructions as set forth below:

Rule1 Filter:
        Source: IP Any Port Any
        Dest IP: 10.10.10.10 port=10
    Rule 2 Filter:
        Source: IP Any Port Any
        Dest IP: 1.1.1.1 port=20

PCEF 106 receives these two filters and determines that the Rule 1 Filter is to be installed on the default bearer and that the Rule 2 Filter is to be installed on the default bearer as per a quality of service (QoS) match. In the case that PCEF 106 is not operating in a redundant filter suppression mode, PCEF 106 sends a message 208 with an update bearer request for filter installation, and AN-GW 108 sends message 208 to UE 112. UE 112 updates the packet filters installed on UE 112 and uses filter identifiers from a pool of filter identifiers to track those filters. UE 112 sends, via AN-GW 108, a message 210 that is an update bearer response message indicating success.

In the case that PCEF 106 is operating in a redundant filter suppression mode, PCEF 106 determines that installing the Rule 1 Filter is redundant to the existing packet filter on the default bearer because the Rule 1 Filter is a subset of the catch all filter already installed for the default bearer. PCEF 106 also determines that installing the Rule 2 Filter is redundant to the existing packet filter on the dedicated bearer because the Rule 2 Filter with port=20 is a subset of the existing packet filter with the port "any" parameter. As a result, PCEF 106 disregards the filter installation instruction, and does not send message 208 with the update bearer request for filter installation.

In either case, PCEF 106 can send a message 212 to notify PCRF 102 of the result, and PCRF 102 can respond with a message 214 to acknowledge the result. For example, message 212 can be a CCR-U message and message 214 can be a CCA-U (success) message. In some examples, if PCEF 106 disregards a filter installation instruction, message 212 indicates to PCRF 102 that the filter installation instruction was disregarded as a result of being in a redundant filter suppression mode.

Figure 3:
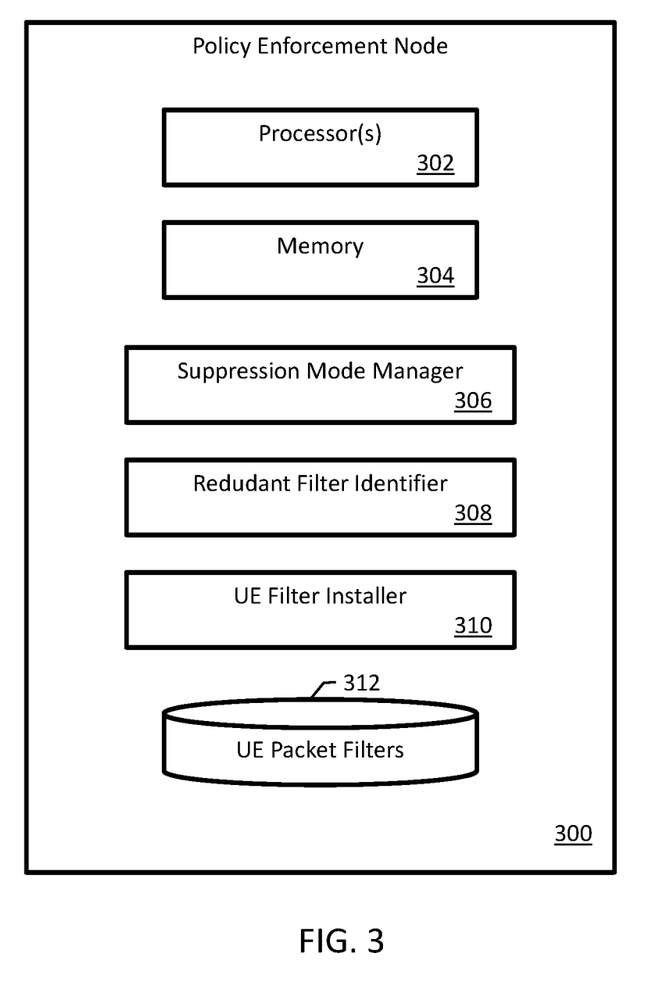
FIG. 3 is a block diagram of an example policy enforcement node configured for suppressing redundant packet filter installation on user equipment in a mobile network.

FIG. 3 is a block diagram of an example policy enforcement node 300 configured for suppressing redundant packet filter installation on user equipment in a mobile network. Policy enforcement node 300 includes one or more processors 302 and memory 304 storing executable instructions for processors 302. Policy enforcement node 300 is configured, by virtue of appropriate programming, to implement a suppression mode manager 306, a redundant filter identifier 308, and a UE filter installer 310 for installing packet filters that are not suppressed as a result of a filter suppression mode.

Suppression mode manager 306 manages whether or not policy enforcement node 300 suppresses redundant filter installation and at what level (e.g., to all bearers or to specific bearers and UEs) policy enforcement node 300 suppresses redundant filter installation. Suppression mode manager 306 determines a suppression mode for policy enforcement node 300 based on a suppression instruction from a policy rules node. For example, the suppression instruction can be a message-level instruction, a rule-level instruction, or a filter-level instruction.

Suppression mode manager 306 can support new AVPs for the suppression instructions. Consider the following two examples of AVPs that can be supported by suppression mode manager 306:

DEF_BEARER_DUP_TFT_SUPPRESS
  Enable/Disable
    This AVP can be sent at message level and would suppress installing duplicate (redundant) filters for default bearer from PCEF.
DUP_TFT_SUPPRESS
  Enable/Disable
    This AVP can be used to suppress duplicate filter installation for any default/dedicated bearer.
  AVP Support Level
    If this AVP is sent at a message level, then it applies to all the bearers, e.g., for that Gx Session, in other words, at APN Level.
    If this AVP is sent at a rule level under the charging-rule-definition AVP, then it suppresses duplicate (redundant) filter installation for that bearer. This would avoid filter installation of that rule to the bearer if a filter superset already exists, i.e., is already installed on the UE. It can be disabled by sending it under any rule having a same QoS value which would match to the same bearer.
    If this AVP is sent at a filter level under the flow-information AVP, then it suppresses duplicate (redundant) filter installation for the filter set inside the flow-information AVP.

With suppression mode manager 306 supporting these AVPs, policy enforcement node 300 can determine whether or not to suppress redundant packet filters based on a precedence hierarchy, generally by giving precedence to more specific suppression rules over more general suppression rules. As an example, policy enforcement node 300 can give precedence to suppression rules as set forth below:

Precedence Level of DUP_TFT_SUPPRESS AVP under different levels:
  DUP_TFT_SUPPRESS value under flow-information AVP overrides the value set for that bearer/rule for that specific filter installation.
  DUP_TFT_SUPPRESS under rule level would overwrite the previous value set for that bearer and would override the value set at session level (message level) for that rule operation.
  DEF_BEARER_DUP_TFT_SUPPRESS value can not be overridden by DUP_TFT_SUPPRESS AVP at filter level or at rule level.
  DEF_BEARER_DUP_TFT_SUPPRESS is disabled to perform level based redundant filter suppression on the default bearer.

Redundant filter identifier 308 determines, for a given packet filter specified in a filter installation instruction, whether the packet filter is redundant to one or more packet filters installed on a UE. For example, redundant filter identifier 308 can compare the packet filter to each of the packet filters installed on the UE by accessing a database 312 storing, for each UE serviced by policy enforcement node 300, a record of packet filters that are installed on the UE.

Redundant filter identifier 308 determines that the packet filter to be installed is redundant because one of the packet filters already installed on the UE specifies each of one or more packet filtering rules of the packet filter to be installed. For example, the packet filter to be installed may be a subset of a packet filter that is already installed, e.g., where a catch-all filter is already installed and the packet to be installed specifies a subset of packets specified by the catch-all filter.

To illustrate the operation of policy enforcement node 300 in various suppression modes, consider the following five example use cases.

Use Case #1: Default filter suppression for default bearer
  PCRF sends DEF_BEARER_DUP_TFT_SUPPRESS AVP with enable to PCEF in CCA or RAR message.
  This AVP is to be sent at message level only and applies to default bearer only.
  PCEF sets the duplicate filter suppression for default bearer.
  If this message was carrying filters for installation, or if a following set of messages carry filters for installation, and the filters for installation are redundant to (e.g., a subset of) already installed filters on the UE then PCEF would suppress the installation of filters.

Operating in suppression mode, PCEF would not allocate a filter identifier to any suppressed filter and would not send an update bearer request message for TFT update.

If there are other actions in the message that trigger a bearer update, then a bearer update would be sent for those actions but not for TFT updates.

PCEF would send a response to PCRF indicating success for rule installation to PCRF, if PCEF was configured to notify rule installation status.

PCRF can disable suppression by sending DEF_BEARER_DUP_TFT_SUPPRESS with disable.

Use Case #2: Redundant filter suppression for APN/Gx session with DUP_TFT_SUPPRESS at message/session level for default and dedicated bearer PCRF sends DUP_TFT_SUPPRESS AVP with enable to PCEF in CCA or RAR message at message level.

At message level this AVP applies to default and all dedicated bearers for that Gx session.

PCEF sets the duplicate (redundant) filter suppression for Gx session.

If this message was carrying filters for installation, or if a following set of messages carry filters for installation, and the filters for installation are redundant to (e.g., a subset of) already installed filters on PCEF then PCEF would suppress the installation of filters.

Operating in suppression mode, PCEF would not allocate a filter identifier to any suppressed filter and would not send an update bearer request message for TFT update.

If there are other actions in the message that trigger a bearer update, then a bearer update would be sent for those actions but not for TFT updates.

PCEF would send a response to PCRF indicating success for rule installation to PCRF, if PCEF was configured to notify rule installation status.

PCRF can disable suppression by sending DUP_TFT_SUPPRESS AVP with disable.

Use Case #3: Filter suppression with DUP_TFT_SUPPRESS at bearer level

PCRF sends DUP_TFT_SUPPRESS AVP with enable to PCEF in CCA or RAR message at rule-level under charging rule definition AVP At rule-level this AVP applies to the bearer associated with QoS value of the associated rule.

It could be either default or dedicated bearer depending on QoS value of associated rule.

PCEF sets the duplicate (redundant) filter suppression for associated bearer.

Now if this message was carrying filters for installation or if next set of message carry filter which are subset of already installed filters on PCEF then PCEF would suppress the installation of filters.

Operating in suppression mode, PCEF would not allocate a filter identifier to any suppressed filter and would not send an update bearer request message for TFT update.

If there are other actions in the message that trigger a bearer update, then a bearer update would be sent for those actions but not for TFT updates.

PCEF would send a response to PCRF indicating success for rule installation to PCRF, if PCEF was configured to notify rule installation status.

PCRF can disable suppression by sending DUP_TFT_SUPPRESS AVP with disable at rule-level.

Use Case #4: Precedence of DUP_TFT_SUPPRESS at different levels

DUP_TFT_SUPPRESS carries highest precedence at filter-level followed by rule-level and then session/message level.

If DUP_TFT_SUPPRESS is sent at a message/session level, rule-level, and filter-level, then the value of DUP_TFT_SUPPRESS is taken in consideration for this message processing and other level values are ignored for that specific operation but values for session-level and bearer-level are saved in PCEF for the next set of operations.

If DUP_TFT_SUPPRESS is sent at a message/session level and rule-level, then value of rule-level is taken in consideration for this message processing but values of session-level and rule-level are saved for the next set of messages.

Use Case #5: DEF_BEARER_DUP_TFT_SUPPRESS vs DUP_TFT_SUPPRESS

If an operation is contention for the default bearer with DEF_BEARER_DUP_TFT_SUPPRESS and DUP_TFT_SUPPRESS AVP values then DEF_BEARER_DUP_TFT_SUPPRESS value takes preference for the default bearer.

Figure 4:
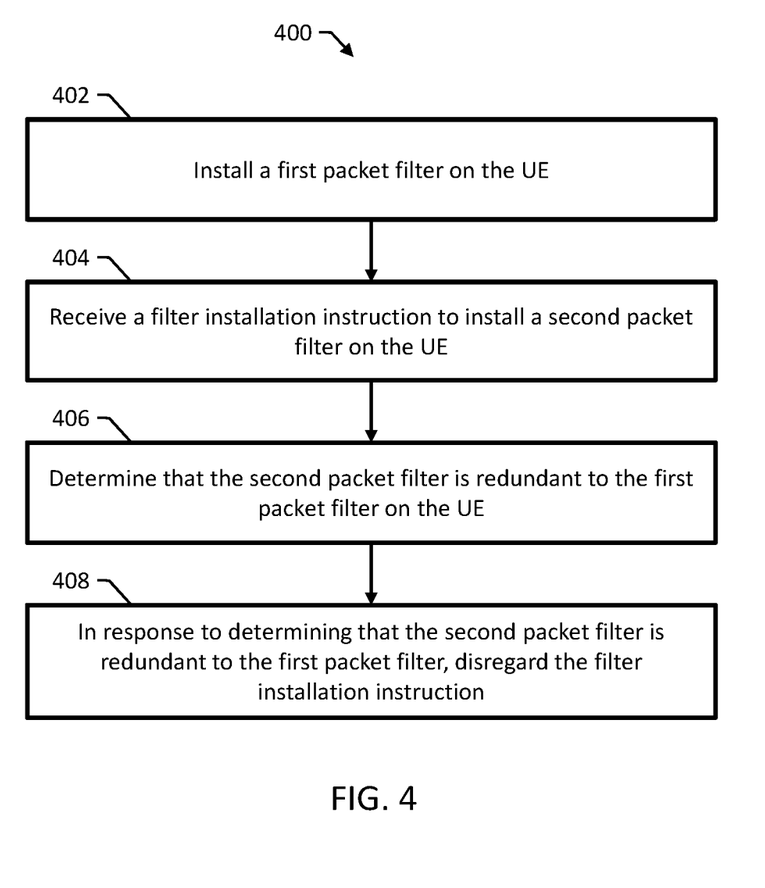
FIG. 4 is a flow diagram of an example method for suppressing redundant packet filter installation on user equipment in a mobile network.

FIG. 4 is a flow diagram of an example method 400 for suppressing redundant packet filter installation on user equipment in a mobile network. Method 400 can be performed by a policy enforcement node implemented on one or more computer systems, e.g., the PCEF 106 of FIG. 1 and the policy enforcement node 300 of FIG. 3.

Method 400 includes installing at least a first packet filter on a UE for the mobile network (402). In some examples, installing the first packet filter includes allocating a first filter identifier to the first packet filter from a pool of a limited number of filter identifiers for the UE.

Method 400 includes, after installing the first packet filter on the UE, receiving a filter installation instruction from a policy rules node for the policy enforcement node to install at least a second packet filter on the UE (404). Method 400 includes determining that the second packet filter is redundant to the first packet filter because the first packet filter specifies each of one or more packet filtering rules of the second packet filter and the first packet filter is installed on the UE (406).

Method 400 includes in response to determining that the second packet filter is redundant to the first packet filter, disregarding the filter installation instruction to install the second packet filter on the UE (408). Disregarding the filter installation instruction can include refraining from allocating a second filter identifier to the second packet filter. Disregarding the filter installation instruction can include sending a response to the policy rules node indicating successful filter installation.

In some examples, method 400 includes receiving, before receiving the filter installation instruction, a suppression instruction from the policy rules node to suppress redundant packet filter installation by the policy enforcement node. Then, disregarding the filter installation instruction can include disregarding the filter installation instruction as a result of both receiving the suppression instruction and determining that the second packet filter is redundant to the first packet filter.

The suppression instruction can be, e.g., a message-level instruction for the policy enforcement node to suppress redundant packet filter installation on any default bearers established by the policy enforcement node or on each bearer of one or more bearers for a session of the UE. The suppression instruction can be a rule-level instruction for the policy enforcement node to suppress redundant packet filter installation on a particular bearer of one or more bearers for a session of the UE. The suppression instruction can be a filter-level instruction for the policy enforcement node to suppress redundant packet filter installation for a particular filter set specified by the suppression instruction.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for suppressing redundant packet filter installation on user equipment in a mobile network, the method comprising:
    at a policy enforcement node comprising at least one processor:
        installing at least a first packet filter on user equipment (UE) for the mobile network;
        after installing the first packet filter on the UE, receiving a filter installation instruction from a policy rules node for the policy enforcement node to install at least a second packet filter on the UE;
        determining that the second packet filter is redundant to the first packet filter because the first packet filter specifies each of one or more packet filtering rules of the second packet filter and the first packet filter is installed on the UE; and
        in response to determining that the second packet filter is redundant to the first packet filter, disregarding the filter installation instruction to install the second packet filter on the UE and sending a response to the policy rules node indicating successful filter installation, wherein the response to the policy rules node indicating successful filter installation indicates that the second packet filter has been installed on the UE even though the second packet filter has not been installed on the UE;
    wherein the method comprises receiving, before receiving the filter installation instruction, a suppression instruction from the policy rules node to suppress redundant packet filter installation by the policy enforcement node, wherein disregarding the filter installation instruction comprises disregarding the filter installation instruction as a result of both receiving the suppression instruction and determining that the second packet filter is redundant to the first packet filter.

2. The method of claim 1, wherein the suppression instruction is a message-level instruction for the policy enforcement node to suppress redundant packet filter installation on any default bearers established by the policy enforcement node.

3. The method of claim 1, wherein the suppression instruction is a message-level instruction for the policy enforcement node to suppress redundant packet filter installation on each bearer of one or more bearers for a session of the UE.

4. The method of claim 1, wherein the suppression instruction is a rule-level instruction for the policy enforcement node to suppress redundant packet filter installation on a particular bearer of one or more bearers for a session of the UE.

5. The method of claim 1, wherein the suppression instruction is a filter-level instruction for the policy enforcement node to suppress redundant packet filter installation for a particular filter set specified by the suppression instruction.

6. The method of claim 1, wherein the mobile network is a long term evolution (LTE) network, the policy enforcement node is an LTE policy and charging enforcement function (PCEF), and the policy rules node is an LTE policy and charging rules function (PCRF).

7. The method of claim 6, comprising receiving a credit-control-answer (CCA) or re-auth-request (RAR) message from the PCRF containing a suppression instruction to suppress redundant packet filter installation by the PCEF.

8. The method of claim 1, wherein installing the first packet filter comprises allocating a first filter identifier to the first packet filter from a pool of a limited number of filter identifiers for the UE, and wherein disregarding the filter installation instruction comprises refraining from allocating a second filter identifier to the second packet filter.

9. A system for suppressing redundant packet filter installation on user equipment in a mobile network, the system comprising:
    at least one processor; and
    a policy enforcement node implemented on the at least one processor and configured to perform operations comprising:
        installing at least a first packet filter on user equipment (UE) for the mobile network;
        after installing the first packet filter on the UE, receiving a filter installation instruction from a policy rules node for the policy enforcement node to install at least a second packet filter on the UE;
        determining that the second packet filter is redundant to the first packet filter because the first packet filter specifies each of one or more packet filtering rules of the second packet filter and the first packet filter is installed on the UE; and
        in response to determining that the second packet filter is redundant to the first packet filter, disregarding the filter installation instruction to install the second packet filter on the UE and sending a response to the policy rules node indicating successful filter installation, wherein the response to the policy rules node indicating successful filter installation indicates that the second packet filter has been installed on the UE even though the second packet filter has not been installed on the UE;
    wherein the operations comprise receiving, before receiving the filter installation instruction, a suppression instruction from the policy rules node to suppress redundant packet filter installation by the policy enforcement node, wherein disregarding the filter installation instruction comprises disregarding the filter installation instruction as a result of both receiving the suppression instruction and determining that the second packet filter is redundant to the first packet filter.

10. The system of claim 9, wherein the suppression instruction is a message-level instruction for the policy enforcement node to suppress redundant packet filter installation on any default bearers established by the policy enforcement node.

11. The system of claim 9, wherein the suppression instruction is a message-level instruction for the policy enforcement node to suppress redundant packet filter installation on each bearer of one or more bearers for a session of the UE.

12. The system of claim 9, wherein the suppression instruction is a rule-level instruction for the policy enforcement node to suppress redundant packet filter installation on a particular bearer of one or more bearers for a session of the UE.

13. The system of claim 9, wherein the suppression instruction is a filter-level instruction for the policy enforcement node to suppress redundant packet filter installation for a particular filter set specified by the suppression instruction.

14. The system of claim 9, wherein the mobile network is a long term evolution (LTE) network, the policy enforcement node is an LTE policy and charging enforcement function (PCEF), and the policy rules node is an LTE policy and charging rules function (PCRF).

15. The system of claim 14, the operations comprising receiving a credit-control-answer (CCA) or re-auth-request (RAR) message from the PCRF containing a suppression instruction to suppress redundant packet filter installation by the PCEF.

16. The system of claim 9, wherein installing the first packet filter comprises allocating a first filter identifier to the first packet filter from a pool of a limited number of filter identifiers for the UE, and wherein disregarding the filter installation instruction comprises refraining from allocating a second filter identifier to the second packet filter.

17. A non-transitory computer readable medium having stored thereon executable instructions that when executed by one or more processors control the one or more processors to perform operations comprising:
at a policy enforcement node of a mobile network:
installing at least a first packet filter on user equipment (UE) for the mobile network;
after installing the first packet filter on the UE, receiving a filter installation instruction from a policy rules node for the policy enforcement node to install at least a second packet filter on the UE;
determining that the second packet filter is redundant to the first packet filter because the first packet filter specifies each of one or more packet filtering rules of the second packet filter and the first packet filter is installed on the UE; and
in response to determining that the second packet filter is redundant to the first packet filter, disregarding the filter installation instruction to install the second packet filter on the UE and sending a response to the policy rules node indicating successful filter installation, wherein the response to the policy rules node indicating successful filter installation indicates that the second packet filter has been installed on the UE even though the second packet filter has not been installed on the UE;
wherein the operations comprise receiving, before receiving the filter installation instruction, a suppression instruction from the policy rules node to suppress redundant packet filter installation by the policy enforcement node, wherein disregarding the filter installation instruction comprises disregarding the filter installation instruction as a result of both receiving the suppression instruction and determining that the second packet filter is redundant to the first packet filter.

* * * * *